US011985158B2

(12) United States Patent
Shivanna et al.

(10) Patent No.: US 11,985,158 B2
(45) Date of Patent: May 14, 2024

(54) ADAPTIVE MACHINE LEARNING PLATFORM FOR SECURITY PENETRATION AND RISK ASSESSMENT

(71) Applicant: Hewlett Packard Enterprise Development LP, Houston, TX (US)

(72) Inventors: Suhas Shivanna, Karnataka (IN); Narsimha Nikhil Raj Padal, Karnataka (IN); Nalamati Sai Rajesh, Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 494 days.

(21) Appl. No.: 17/226,173

(22) Filed: Apr. 9, 2021

(65) Prior Publication Data

US 2021/0400076 A1 Dec. 23, 2021

(51) Int. Cl.
*H04L 9/40* (2022.01)
*G06N 20/00* (2019.01)

(52) U.S. Cl.
CPC ......... *H04L 63/1433* (2013.01); *G06N 20/00* (2019.01)

(58) Field of Classification Search
CPC .................................................. H04L 63/1433

USPC ......................................................... 726/25
See application file for complete search history.

(56) References Cited

U.S. PATENT DOCUMENTS

| 5,991,709 A | 11/1999 | Schoen |
| 2019/0182289 A1 | 6/2019 | White et al. |
| 2021/0344703 A1* | 11/2021 | Barajas ............... G06F 16/2379 |

OTHER PUBLICATIONS

Alves et al., "Design of a Classification Model for a Twitter-based Streaming Threat Monitor", International Conference on Dependable Systems and Networks Workshops, 2019, 6 Pages.
(Continued)

*Primary Examiner* — Anthony D Brown
(74) *Attorney, Agent, or Firm* — Hewlett Packard Enterprise Patent Department

(57) ABSTRACT

Systems and methods are provided for implementing an adaptive machine learning platform for security penetration and risk assessment. For example, the system can receive publicly-available information associated with a client computer system, process the information to identify an input feature, and implement a machine learning model to identify the corresponding risk associated with the input feature. The system can recommend a penetration test for discovered weaknesses associated with the input feature and help make changes to the client computer system to improve security and reduce risk overall.

20 Claims, 8 Drawing Sheets

(56) References Cited

OTHER PUBLICATIONS

Ayoade et al., "Automated Threat Report Classification Over Multi-Source Data", IEEE 4th International Conference on Collaboration and Internet Computing, Nov. 2018, 11 Pages.

Fasulo, P., "What is Information Risk Management?", (Research Paper), Dec. 11, 2019, 12 Pages.

Mihalcea et al., "TextRank: Bringing Order into Text", Proceedings of the 2004 Conference on Empirical Methods in Natural Language Processing, Jul. 2004, 8 pages.

NLTK 3.5 documentation, "Natural Language Toolkit", available online at <https://web.archive.org/web/20200429123550/https://www.nltk.org/>, Apr. 29, 2020, 2 pages.

Roy et al., "Automation of Cyber-Reconnaissance A Java-based Open Source Tool for Information Gathering", Research Paper, Dec. 2017, 5 Pages.

Wikipedia, "Penetration Test", available online at <https://en.wikipedia.org/w/index.php?title=Penetration_test&oldid=961328900>, June, 7, 2020, 8 pages.

* cited by examiner

Job Posting 200

Company: Acme Co.

Position: Technical Lead

Minimum Qualifications:

- Bachelor's degree in a related field

- Well-versed in interfacing, JSON, and APIs

- Troubleshoot technical issues with Beta Brand servers, Beta Co. storage, and Beta LLC Data Center Management solutions

FIG. 2

| Input Feature 402 | Category 404 | Risk Level 406 |
|---|---|---|
| Beta Brand server | Software | 8 |
| Beta Co. storage | Device | 7 |
| Beta LLC Data Center Management Solution | Software | 4 |
| "Password!" | Weak Default Password | 5 |
| Remote Access Presence | Software | 2 |

FIG. 4

| Input Feature 402 | | | | Category 404 | Risk Level 406 |
|---|---|---|---|---|---|
| Beta Brand server(0/1) | Beta Co. Storage(0/1) | Beta LLC Data Center Management Solution(0/1) | "Password!" (0/1) | Remote Access Presence(0/1) | | |
| 1 | 0 | 0 | 0 | 0 | 1 | Low (2) |
| 0 | 1 | 0 | 0 | 0 | 2 | Low (3) |
| 0 | 0 | 1 | 0 | 0 | 1 | Medium (5) |
| 0 | 0 | 0 | 1 | 0 | 3 | High (9) |
| 0 | 0 | 0 | 0 | 1 | 1 | High (8) |

| Category 404 | Label |
|---|---|
| Software | 1 |
| Device | 2 |
| Weak default Password | 3 |

FIG. 5

ADAPTIVE MACHINE LEARNING PLATFORM FOR SECURITY PENETRATION AND RISK ASSESSMENT

DESCRIPTION OF RELATED ART

There are several security risks to distributed and industrial systems. In hopes of finding these security risks, administrative users may perform penetration testing to identify the security weaknesses in the system. This extraction of information about any computer system is normally called foot printing or reconnaissance and can be an intensive and cumbersome activity that lays the foundation for the penetration testing activity. However, foot printing or reconnaissance is difficult and time consuming to perform for internal users, who are familiar with the systems and may be blind to the weaknesses of it, as well as external third party penetration testers who do not have knowledge of the internal system. Better and holistic penetration testing processes are needed to uncover security issues more efficiently before a product or service is deployed for larger use.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 2 provides an illustration of a data source, in accordance with an embodiment of the application.

FIG. 4 provides an illustrative example of the use of the ML model output, in accordance with an embodiment of the application.

FIG. 5 provides an illustrative example of training the ML model, in accordance with an embodiment of the application.

The figures are not exhaustive and do not limit the present disclosure to the precise form disclosed.

DETAILED DESCRIPTION

Embodiments of the present disclosure provide a security and risk assessment computer system to perform penetration testing of a client computer system that may be either standalone or distributed across multiple computer systems. The security and risk assessment computer system may perform the penetration testing as a remote third party system without approved access or authentication credentials of the client computer system, or generally as an entity that is unfamiliar with the client computer system and/or application.

In this role, the security and risk assessment computer system may uncover traditional and untraditional sources of security information about the client computer system from various sources before the start of exploitation. The information may include documentation describing systems and technology that is implemented internally for the client computer system to execute programs within the system, or probable configuration of technical controls of the infrastructure that may be critical for identifying exploitable weaknesses in the computer system. Untraditional sources of information may be identified as well. For example, the information may be identified from job portals that advertise technical openings for employees who will be in charge of maintaining the client computer system. The skills required in the job posting may be used to infer the technology used by the company, and in turn impart any weaknesses associated with the technology as a weakness of the client computer system as well.

In some examples, the security and risk assessment computer system may smartly gather publicly available data with an automated crawler engine to increase the scale of the data extraction process and increase data gathering efficiency. The security and risk assessment computer system may feed the information gathered using various engines to identify relevant security features and weaknesses of the computer system. For example, the security and risk assessment computer system may comprise a reconnaissance engine to gather disparate sources of data with a knowledge base, an orchestration engine with machine learning to identify potential weaknesses in the client computer system, and a penetration testing framework that may generate a customized penetration testing plan that exploits potential weaknesses of the client computer system. When the weaknesses are exploited and the penetration testing is able to gain unpermitted access to the client computer system, the client computer system may be adjusted to alter features of the client computer system to reduce or mitigate weaknesses associated with it. These adjustments may improve the security of the system overall against future attacks.

Figure 1:
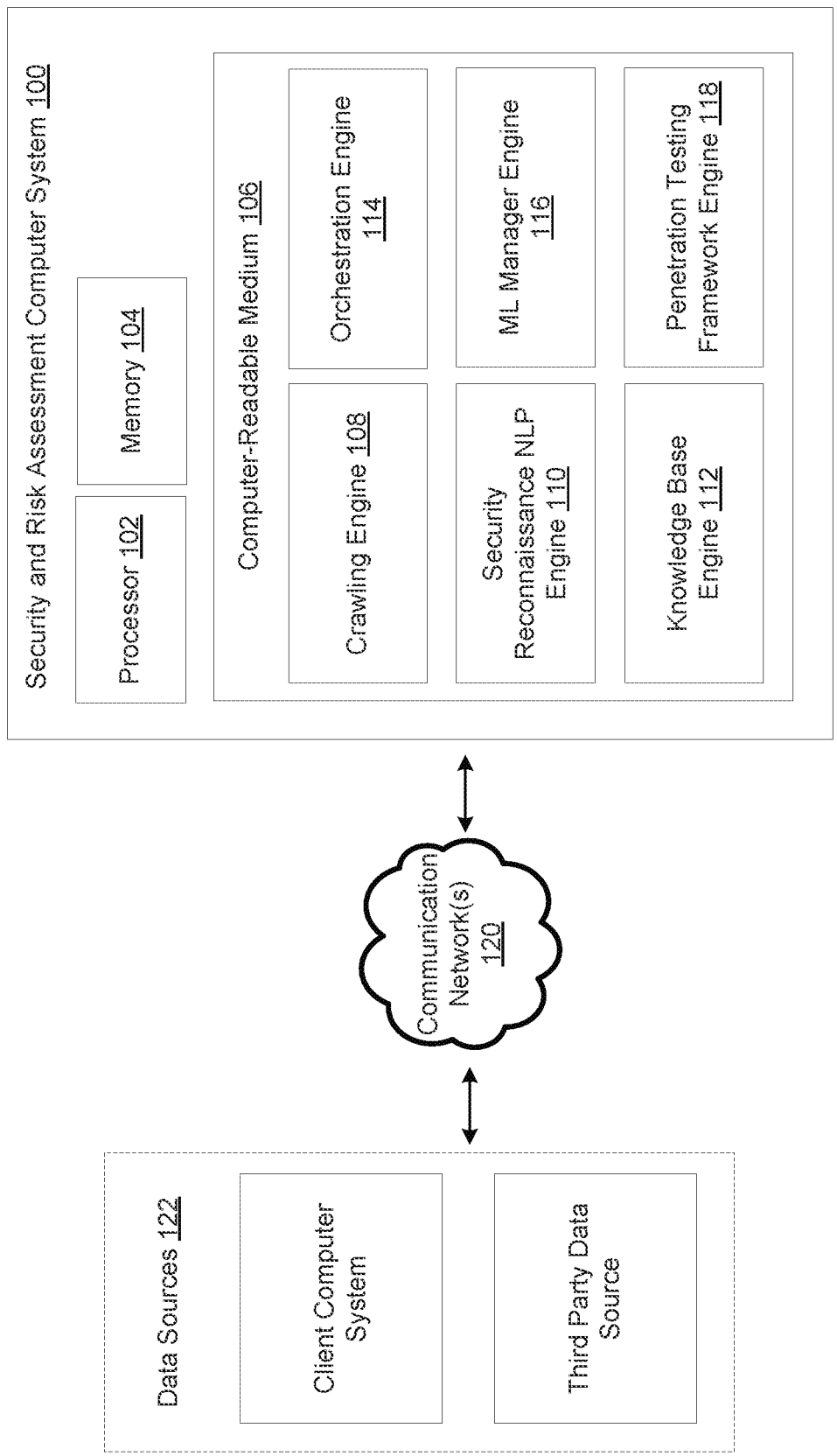
FIG. 1 provides an adaptive machine learning computer system for security penetration and risk assessment, in accordance with an embodiment of the application.

FIG. 1 provides an adaptive machine learning computer system for security penetration and risk assessment, in accordance with an embodiment of the application. Computer system 100 may perform penetration testing on a client computer system that is accessible via communication network 120 using one or more data sources 122, including data received from the client computer system or third party data source.

Computer system 100 may comprise one or more processors 102 and one or more memories 104 for storing machine executable instructions in a computer readable medium 106 to perform operations for adaptive machine learning computer system for security penetration and risk assessment. Additional detail about one or more processors 102 and one or more memories 104 are provided with FIG. 7-8.

Computer readable medium 106 may comprise crawling engine 108, security reconnaissance NPL engine 110, knowledge base engine 112, orchestration engine 114, ML manager engine 116, and penetration testing framework engine 118. Any of these engines may communicate with external data sources 122 accessible via communication network 120, as described herein.

Computer system 100 may implement crawling engine 108. Crawling engine 108 may access data sources 122 via communication network 120 to access publicly-available information. Crawling engine 108 may receive context-based information from multiple resources, including a job portal, company website, or other publishing channel, product user guide, article describing technology produced by the company, enterprise portal, chat board, support site, and the like. The information identified from these sources may be associated with the client computer system. For example, the crawled information may include a technology stack implemented by the client computer system from user guides and whitepapers. In another example, the information may include product release notes that describe new security features or defects that are fixed without customer advisories.

An illustrative data source 122 is provided with FIG. 2. Job posting 200 includes information about the client computer system, including a company name ("Acme Co."), position relating to the job posting ("technical lead"), and minimum qualifications associated with the position (e.g., "bachelor's degree in a related field," "well-versed in interfacing, JSON, and APIs," and "troubleshoot technical issues with Beta Brand servers, Beta Co. storage, and Beta LLC Data Center Management solutions"). The information in this job posting may identify technology used by the client computer system in its internal environment, including JSON (JavaScript Object Notation) data-interchange format, APIs (Application Programming Interfaces), Beta Brand servers, Beta Co. storage, and Beta LLC Data Center Management solutions. This may also identify any security risks of the client computer system because of the security risks associated with this technology.

Figure 3:
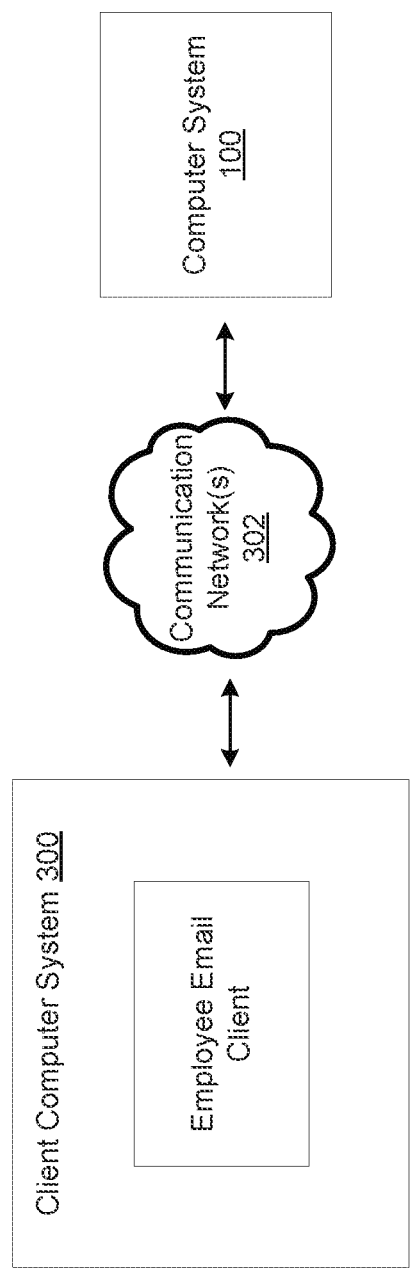
FIG. 3 provides an illustration of a data source, in accordance with an embodiment of the application.

A second illustrative data source 122 is provided with FIG. 3. The initial information may also include information from social media sites to identify employees who can be social engineering targets (e.g., via spear phishing, etc.) and mine messages that may provide leads about security posture or controls of the distributed system. Once the employee's name, email address, and/or other information is identified (e.g., by crawling engine 108, etc.) and/or key individuals based on roles are identified, computer system 100 can be used to transmit a directed email via communication network 302 to client computer system 300 that is addressed to the employee. When the employee opens the email, accesses an attachment with malicious content, and/or activates a link directed to malicious content, the malicious content may be executed within client computer system 300 environment. The access within this environment may provide more access for the malicious content to client computer system 300 by computer system 100 than was accessible externally, which may have been blocked by firewalls or other security measures.

Other examples are applicable without diverting from the essence of the disclosure. For example, the publicly-available information may be stored within any network accessible document that comprises information about a company, product, company security posture, privacy practices, compliance status, and probable configuration of technical controls of the infrastructure. In some examples, the publicly-available information like user guides, security white paper may be accessible without any authentication process allowing to read and parse the contents of the document. For penetration testing performed by internal users, information like a user guide or security white paper can also be input to computer system 100 by a penetration test engineer.

In some examples, data may be received from product user guides, release notes, or white papers along with other information crawling engine 108 has already captured (e.g. job portal, social media etc.). These data sources 122 may correspond with client computer system prior to release of client computer system to the public and/or when the information has been gathered about the product while under development. Client computer system may be subject to the penetration test prior to the system being released to the public so that security risks to the system are fixed prior to releasing the system in a production environment.

In some examples, data may be received by continuously monitoring network document sources. For example, data sources 122 may correspond with a set of web portals or network locations with documents and social media feeds that have historically been used to store sensitive information that increases the risk for the client computer system. The continuous monitoring of these publicly-exposed documents can help reduce the increased exposure of a security attack.

Returning to FIG. 1, crawling engine 108 may automatically search and gather the publicly-available information with an automated web crawler. In some examples, crawling engine 108 can browse the World Wide Web or other configured systems without approval from client computer system to perform data scraping operations used for extracting data from network documents (e.g., websites, web pages, accessible documents via a network connection, etc.). Crawling engine 108 may access the network document associated with the client computer system, by performing a keyword search of the network document found by crawling engine 108 using security corpus. Other matching processes may be performed to identify a name or descriptor of the client computer system found with the publicly available information or the network document. Crawling engine 108 may also have the capability to ingest data from multiple sources with multiple data formats like Portable Document Format (PDF), text documents, and Hypertext Markup Language (HTML).

Crawling engine 108 may copy or fetch publicly-available information and images from the network document. The copied information may be stored within a knowledge base of computer system 100 for later retrieval or analysis.

Crawling engine 108 may extract publicly-available information from the network document. For example, crawling engine 108 may download the network document (e.g., in a temporary cache or other memory of computer system 100) and extract it. The extraction may parse, search, and/or reformat the information included within the network document. In some examples, the extraction process may search for information through text-based processing of the markup languages used to create the network document (e.g., HTML and XHTML). In some examples, the extraction may listen to data feeds from web servers (e.g., using JSON) and extract the information from the data feeds. Crawling engine 108 may also extract information from publicly-available data or heterogeneous sources such as product manuals, social media, etc., as unstructured data.

Security reconnaissance natural language processing (NLP) engine 110 may be configured to receive the unstructured data from crawling engine 108, where the unstructured data contain information that is related to both security and non-security characteristics. Security reconnaissance NLP engine 110 may process the unstructured data using parsing, standardizing, and searching techniques to generate a security context aware curated information. Security reconnaissance NLP engine 110 may be configured to reduce the unstructured data from crawling engine 108 (e.g., hundreds of pages) to more condensed security related information (e.g., 25 pages, etc.) using a corpus of key terms, input features, and other words or phrases related to the security domain. The processing of unstructured data may also include image analysis of architecture diagrams to extract technology specific information like processor technology, hardware component vendor, and other information that can help identify potential weakness and security features of the client system.

The condensed curated data can contain well formatted information that can help penetration testing. Few examples of curated information includes network technology information (e.g., Aruba switches, Cisco routers, etc.), hardware/firmware technology (e.g., ARM processor, External USB, Configurations, encryption support, etc.), application landscape (e.g., OS and other technology stack (e.g. Protocol related information) and open source components, role names for accessing products, etc.), or personnel info (e.g., key e-mail addresses, etc.).

Security reconnaissance NLP engine 110 may also be configured to process the publicly-available information to identify one or more key terms or input features to provide to a machine learning (ML) model. Key terms or input features may include public security data, job descriptions, services, or applications implemented within the distributed system, and other information.

Security reconnaissance NLP engine 110 may be configured to match data with a dictionary of security protocols and a corpus of key terms stored in knowledge base 112. For example, the dictionary may include any key terms or input features used in a plurality of communication protocols, technical systems, or programming languages. Terms in the dictionary may be matched with data provided to the security reconnaissance NLP engine 110. When terms are matched, the context associated with the matched terms may be used to create a condensed version from the crawled data that applies to technical specifications and security posture of the client system.

Security reconnaissance NLP engine 110 may be configured to execute computer-implemented instructions to run an algorithm for performing natural language processing (NLP) (e.g., Text Rank) to generate a further concise summary with security context information (1-2 pages). In some examples, open source machine learning framework may be implemented for natural language processing (NLP) (e.g., Bidirectional Encoder Representations from Transformers or "BERT"). Security reconnaissance NLP engine 110 may be configured to help identify a meaning of ambiguous language in text by using surrounding text to establish context. The summarization can also be done using NLP techniques, parsing, and expression matching (e.g., for retrieving e-mails) to get a good security context based summary for the ingested network documents. This extractive concise summary can act as an input for the penetration test engineer to understand the security related information of the client system and further clarify the penetration testing strategy.

Knowledge base engine 112 can store the output from security reconnaissance NLP engine 110 and collate it to build a knowledge base of curated data. Knowledge base can maintain the comprehensive information about unique key terms or input features that indicate a security feature or weakness, corresponding security risks and associated mitigations and penetration testing methodology. In some examples, the dictionary with key security terms used for natural language processing may also be added to the knowledge base. The key terms or input features can map to security information around technology stack, weak protocols, architecture specific key terms, password policies, configuration information, etc. Some examples for keywords stored in the dictionary are transport layer security (TLS), file transfer protocol (FTP), network time protocol (NTP), encryption, configuration, generic terms like "password" and "security," and the like.

Orchestration engine 114 can help coordinate the penetration testing risk activities and penetration testing activities using the crawling engine 108, NLP engine 110, Knowledge base engine 112, ML Manager engine 116 and Penetration testing framework engine 118.

In some examples, orchestration engine 114 may be configured to perform feature extraction to support analyzing images or architecture diagrams. The information may identify information in legends and texts that could help detect the technology stack or other relevant information.

ML manager engine 116 may be configured to train and run a machine learning model. For example, the machine learning (ML) methods may identify security risks and potential exposure to security attacks using an algorithm that can classify the extracted security key features from the summarized document into a particular classification category of a plurality of classification categories (e.g. high, medium, or low exposure).

To train the ML model, ML manager engine 116 may correlate entity and context from the summarized document using NLP technologies (e.g. Word2Vec, NGrams, home grown tools to detect intent and context). This semantic extraction of entities and associated values can help vectorization and converting the unstructured data into structured data and extract key security features and their values. The extracted security features corresponding to the client system may be stored with knowledge base 112.

ML manager engine 116 may also implement a weighting operation of the input features in correlation with the risk corresponding with the key term, or in implementation of vectorization. The training phase may include a subject matter expert classifying the output value indicating potential risk and exposure of different client systems using multiple security features used as input features to the ML model. Some examples of security features include the presence of standard default password, remote access support, lack of support for strong password, technology stack built with vulnerable or obsolete components, and the like. The classification output can correspond to a classification category indicating the potential security exposure using values like high, medium, low or other relevant values. Different classification algorithms like Random forest, decision tree, and the like, can be used during the training phase.

During the inference phase, ML manager engine 116 may provide input features associated with the client system saved in the knowledge base to the trained ML model. The trained machine learning (ML) model can help derive the overall security risk and exposure using the ML model output with values like high, medium and low indicating the relative risk and exposure for the client computer system. For example, if the distributed system is identified as implementing Operating System 1.0 (e.g., technology stack with vulnerable components) and the same operating system may correspond with a recent security breach, the security risk of the system overall may be categorized as "high" to indicate a potential security breach for the client computer system with the same technical specification. The ML model may also help identify the threat sensitivity level in the publicly available sources and help product teams avoid vulnerabilities being widely exposed to public. For example, an exposure level of "high" may be due to the presence of public documentation containing default password values, presence of low level technology stack details in user guides, and the like.

The output of the ML model may identify the risk and exposure of new products and client systems that are being assessed for penetration testing. In some examples, once the features are extracted from the summarization document and knowledge base, well-known weakness may be identified and the overall security risk and exposure for the client system can be derived. These well-known weaknesses may include weak protocols, an identification of a default password, presence of a backdoor, operating system version and associated risks, presence of external maintenance ports that can be used as an attack vector, and the like. ML manager engine 116 may implement computer-based rules to skip the ML model phase and automatically correlate the well-known weaknesses with the exposure level (e.g., high, medium, low, etc.). The computer-based rules may identify input features to the ML model and classify the exposure due to public documents.

An illustrative example of the usage of ML model output is provided with FIG. 4. The ML output may correspond with a term mapping to multiple input features 402. In some examples, category 404, risk level 406, risk description, and active risk can be derived using the ML model output and the metadata stored in the knowledge base. Each of these terms may be stored with a database or other data storage system.

Input feature 402 may correspond with one or more key terms identified in the knowledge base. Input feature 402 includes terms and security features extracted by the ML manager engine 116 using entity extraction, semantic analysis, vectorization techniques, and the like.

Category 404 may correspond with a grouping of input feature 402 in terms of the risk introduced to the client computer system. For example, input feature 402 identified may be "Beta Brand server" and the portion of the server that is known to correspond to a particular risk is "software." Multiple categories are available for any feature, including "weak default password", "weak cipher support, "hardware," "protocol," "port," "software," or other features of the object.

Risk level 406 may classify input feature 402 as corresponding with a numerical threat score (e.g., 0-10, etc.) or a textual threat score, like high, medium, or low risk, for example. This may help identify the classification category of the corresponding input feature 402.

Information from the knowledge base may be used to assess risks and plan the penetration test recommendation as well. These and other data stored with the knowledge base may be used as input features to the ML model.

The knowledge base may comprise a risk description identifier. The risk description may identify the particular security risk that corresponds with input feature 402, category 404, and/or risk level 406. For example, the risk description may correspond with a "software bug" with Beta Brand server, a "port" may be susceptible to attacks in a Beta Co. storage device, and a "software bug" may be identified with Beta LLC Data Center Management solution.

The knowledge base may comprise an active risk identifier. Active risk may identify whether the risk is an active risk or a resolved risk. For example, the data corresponding with active risk may be a binary tag (e.g., yes or no, 0 or 1, etc.) or other indication of whether the risk is active on a particular date (e.g., current date, etc.).

FIG. 5 provides an illustrative example of training the ML model, in accordance with an embodiment of the application. Input feature 402, category 404, and risk level 406 may be utilized with the training. In some examples, the ML model may receive a set of input features 402 and one output value corresponding to the classified category or value. As illustrated, each row of input features may correspond with a data source for the client computer system. Binary values may be associated with each input feature 402 to correlate the particular input feature with the data source (e.g., 0 or 1, etc.). A range of values or text descriptions may be used to correlate category 404 and risk level with each data source as well (e.g., 1-3, 0-10, etc.). These values may be used to train the ML model as described herein. In some examples, some extracted features and ML model output can be used to derive more information using the knowledge base. This information may be used to enhance the penetration testing.

Returning to FIG. 1, ML manager engine 116 may also be configured to determine an overall confidence score. For example, the overall confidence score may correspond with the highest risk level associated with the various components of client computer system. This may illustrate a weakest link of the system and the most susceptible point of access by a fraudster. In some examples, the overall confidence score may correspond with an average of the risk levels or other calculation to identify an overall confidence score of the ML model.

ML manager engine 116 may be retrained. For example, when a security risk is fixed, the input feature may remain in documentation associated with the client computer system but the corresponding risk value or category may be adjusted. The risk associated with a particular hardware device or software may be reduced when a security issue is fixed. In some examples, user feedback may be received that identifies a new security risk. The corresponding risk value or category may be adjusted to be greater than previously determined.

In some examples, the ML model may be retrained based upon a triggering event, including receiving user feedback that a security threat has been mitigated or an indication of a new security threat (e.g., based on a data feed or other threat intelligence feed, etc.). The new security threat may be filtered to match an input feature corresponding with the client computer system. In some examples, the ML model may be retrained periodically (e.g., once per week, etc.).

Computer system 100 may also comprise penetration testing framework engine 118. Penetration testing framework engine 118 may be configured to generate a report from this and other information that can be provided to the administrative user, which includes security context aware curated information, which may include both unstructured and structured data. For example, the report may include a recommendation to reduce information about a technology stack in a particular public document that potentially helps reduce exposure to real attacks.

Figure 6:
FIG. 6 provides an illustrative example of a penetration testing report, in accordance with an embodiment of the application.

An illustrative report is provided with FIG. 6. Penetration testing framework engine 118 may add relevant information to report 600, including the risk classification, along with the particular input features identified as causing the security risk and/or suggestions on how to mitigate the risk (e.g., removing a particular device or software, or implementing a different operating system than Operating System 1.0, etc.). Report 600 can identify the exposure level and weaknesses in the client computer system. The weaknesses may be ordered or ranked based on the weaknesses that create the highest relative security risk in the client computer system.

Penetration testing framework engine 118 may also be configured to generate a penetration test or overall penetration testing plan for the client system. The penetration test may be generated that are customized to the distributed client system and based on security risks identified by computer system 100. The administrative user may execute or run one or more penetration tests in an external or internal environment to see if a third party would be able to penetrate and get access to data internal to the client computer system. The penetration test may identify the most successful ways to attack the security of the system or highlight any weakness in the system, thereby performing penetration testing more efficiently. When these security risks are resolved, the overall security of the system may be improved.

Penetration testing framework engine 118 may also be configured to implement a penetration testing framework for client computer system from computer system 100. Penetration testing framework engine 118 may execute computer-based instructions to automatically access software or hardware in the client computer system (e.g., feature information extracted from NLP techniques, etc.). Penetration testing framework engine 118 may recommend penetration testing cases for client computer system to run using the identified risks. The knowledge base can used to identify customized penetration test cases with details of the exploits and/or steps to carry out the penetration testing based on the discovered security features, classification category and/or confidence score determined by the ML model.

Figure 7:
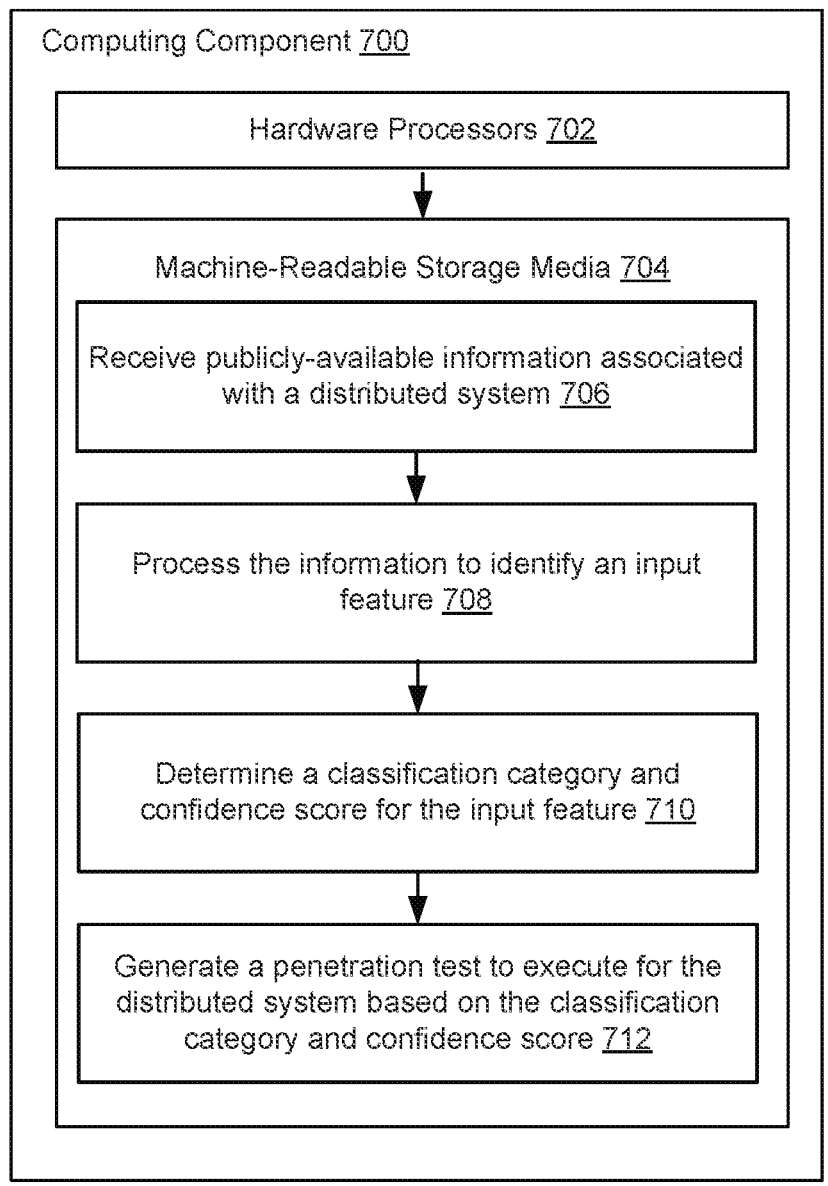
FIG. 7 illustrates a computing component for providing an adaptive machine learning computer system for security penetration and risk assessment, in accordance with an embodiment of the application.

FIG. 7 illustrates an example iterative process performed by a computing component 700 for provide a security and risk assessment and/or perform penetration testing of a client computer system. Computing component 700 may be, for example, a server computer, a controller, or any other similar computing component capable of processing data. In the example implementation of FIG. 7, the computing component 700 includes a hardware processor 702, and machine-readable storage medium 704. In some embodiments, computing component 700 may be an embodiment of a computer system 100 of FIG. 1.

Hardware processor 702 may be one or more central processing units (CPUs), semiconductor-based microprocessors, and/or other hardware devices suitable for retrieval and execution of instructions stored in machine-readable storage medium 704. Hardware processor 702 may fetch, decode, and execute instructions, such as instructions 706-712, to control processes or operations for optimizing the system during run-time. As an alternative or in addition to retrieving and executing instructions, hardware processor 702 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 704, may be any electronic, magnetic, optical, or other physical storage device that contains or stores executable instructions. Thus, machine-readable storage medium 704 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 704 may be a non-transitory storage medium, where the term "non-transitory" does not encompass transitory propagating signals. As described in detail below, machine-readable storage medium 704 may be encoded with executable instructions, for example, instructions 706-712.

Hardware processor 702 may execute instruction 706 to receive publicly-available information associated with a distributed system. In some examples, the publicly-available information is provided absent an authentication process. This may include, for example, information that is posted to a public website or other network document accessible by a web crawler.

Hardware processor 702 may execute instruction 708 to process the information to identify an input feature. For example, hardware processor 702 may be configured to process the publicly-available information to identify the input feature related to security of the distributed system.

Hardware processor 702 may execute instruction 710 to determine a classification category and confidence score for the input feature. For example, the classification category may be selected from a plurality of classification categories that map to potential risk and exposure of the distributed system. Determining the classification category and the confidence score may comprise applying a set of inputs associated with the distributed system to a trained machine-learning (ML) model.

Hardware processor 702 may execute instruction 712 to generate a penetration test to execute for the distributed system based on the classification category and confidence score. For example, upon determining the classification category and the confidence score, hardware processor 702 may be configured to generate a penetration test to execute for the distributed system. The penetration test may be customized based on the related security features, classification category, and the confidence score.

In some examples, the publicly-available information is received from a crawling engine that accesses the publicly-available information from multiple publicly-available network documents.

In some examples, the publicly-available information comprises unstructured data and hardware processor 702 may execute an instruction to generate a report that comprises security context aware curated information. The security context aware curated information may include structured data.

In some examples, hardware processor 702 may be configured to receive an indication of a new security threat from a data feed. The new security threat may be filtered to match the input feature. Hardware processor 702 may retrain the ML model with the indication of the new security threat.

In some examples, hardware processor 702 may be configured to generate a report that identifies the classification category mapping to risk due to exposure of the publicly-available information in the public domain. Hardware processor 702 may transmit the report to a user associated with the distributed system. In some examples, the report further identifies a recommendation for altering a configuration of the distributed system.

In some examples, the penetration test is associated with a security weakness of the distributed system, and the penetration test focuses on the security weakness to gain restricted access to the distributed system.

In some examples, hardware processor 702 may be configured to continuously monitor network document sources for new publicly-available information.

Figure 8:
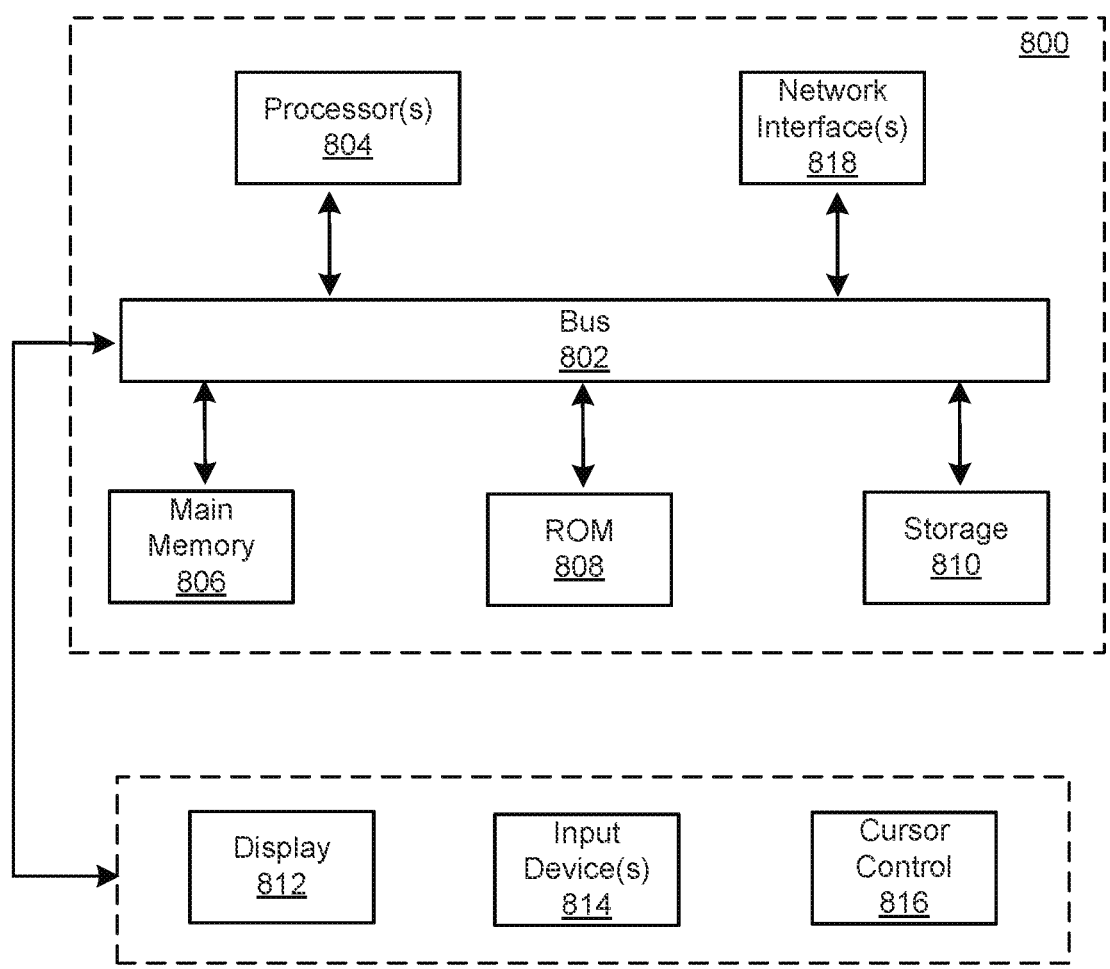
FIG. 8 is an example computing component that may be used to implement various features of embodiments described in the present disclosure.

FIG. 8 depicts a block diagram of an example computer system 800 in which various of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a liquid crystal display (LCD) (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

The computer system 800 also includes a communication interface 818 coupled to bus 802. Communication interface 818 provides a two-way data communication coupling to one or more network links that are connected to one or more local networks. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through communication interface 818, which carry the digital data to and from computer system 800, are example forms of transmission media.

The computer system 800 can send messages and receive data, including program code, through the network(s), network link and communication interface 818. In the Internet example, a server might transmit a requested code for an application program through the Internet, the ISP, the local network and the communication interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A computer-implemented method comprising:
    receiving, by a computer system, publicly-available information associated with a distributed system, wherein the publicly-available information is provided absent an authentication process;
    processing, by the computer system, the publicly-available information to identify an input feature related security features of the distributed system;
    determining, by the computer system, a classification category and a confidence score for the input feature, wherein the classification category is selected from a plurality of classification categories that map to potential risk and exposure of the distributed system, and wherein determining the classification category and the confidence score comprises applying a set of inputs associated with the distributed system to a trained machine-learning (ML) model; and
    upon determining the classification category and the confidence score, generating a penetration test to execute for the distributed system, wherein the penetration test is customized based on the related security features, classification category and the confidence score.

2. The computer-implemented method of claim 1, wherein the publicly-available information is received from a crawling engine that accesses the publicly-available information from multiple publicly-available network documents.

3. The computer-implemented method of claim 1, wherein the publicly-available information comprises unstructured data and the method further comprising:
    generating a report that comprises security context aware curated information, wherein the security context aware curated information contains both structured and unstructured data.

4. The computer-implemented method of claim 1, further comprising:
    receiving an indication of a new security threat from a data feed, wherein the new security threat is filtered to match the input feature; and
    retraining the ML model with the indication of the new security threat.

5. The computer-implemented method of claim 1, further comprising:
    generating a report that identifies the classification category mapping to risk due to exposure of the publicly-available information in the public domain;
    and transmitting the report to a user associated with the distributed system.

6. The computer-implemented method of claim 5, wherein the report further identifies a recommendation for altering a configuration of the distributed system.

7. The computer-implemented method of claim 1, wherein the penetration test is associated with a security weakness of the distributed system, and the penetration test focuses on the security weakness to gain restricted access to the distributed system.

8. The computer-implemented method of claim 1, further comprising:
continuously monitoring network document sources for new publicly-available information.

9. A system, comprising: a memory; and
one or more processors configured to execute machine readable instructions stored in the memory for performing the following steps:
receiving publicly-available information associated with a distributed system, wherein the publicly-available information is provided absent an authentication process;
processing the publicly-available information to identify an input feature related security features of the distributed system;
determining a classification category and a confidence score for the input feature, wherein the classification category is selected from a plurality of classification categories that map to potential risk and exposure of the distributed system, and wherein determining the classification category and the confidence score comprises applying a set of inputs associated with the distributed system to a trained machine-learning (ML) model; and
upon determining the classification category and the confidence score, generating a penetration test to execute for the distributed system, wherein the penetration test is customized based on the related security features, classification category and the confidence score.

10. The system of claim 9, wherein the publicly-available information is received from a crawling engine that accesses the publicly-available information from multiple publicly-available network documents.

11. The system of claim 9, wherein the publicly-available information comprises unstructured data and the one or more processors are further configured to:
generate a report that comprises security context aware curated information, wherein the security context aware curated information contains both structured and unstructured data.

12. The system of claim 9, wherein the one or more processors are further configured to:
receive an indication of a new security threat from a data feed, wherein the new security threat is filtered to match the input feature; and
retrain the ML model with the indication of the new security threat.

13. The system of claim 9, wherein the one or more processors are further configured to:
generate a report that identifies the classification category mapping to risk due to exposure of the publicly-available information in the public domain; and transmit the report to a user associated with the distributed system.

14. The system of claim 13, wherein the report further identifies a recommendation for altering a configuration of the distributed system.

15. The system of claim 9, wherein the penetration test is associated with a security weakness of the distributed system, and the penetration test focuses on the security weakness to gain restricted access to the distributed system.

16. The system of claim 9, wherein the one or more processors are further configured to:
continuously monitor network document sources for new publicly-available information.

17. A non-transitory computer-readable storage medium storing a plurality of instructions executable by one or more processors, the plurality of instructions when executed by the one or more processors cause the one or more processors to:
receive publicly-available information associated with a distributed system, wherein the publicly-available information is provided absent an authentication process;
process the publicly-available information to identify an input feature related security features of the distributed system;
determine a classification category and a confidence score for the input feature, wherein the classification category is selected from a plurality of classification categories that map to potential risk and exposure of the distributed system, and wherein determining the classification category and the confidence score comprises applying a set of inputs associated with the distributed system to a trained machine-learning (ML) model; and
upon determining the classification category and the confidence score, generate a penetration test to execute for the distributed system, wherein the penetration test is customized based on the related security features, classification category and the confidence score.

18. The non-transitory computer-readable storage medium of claim 17, wherein the publicly-available information is received from a crawling engine that accesses the publicly-available information from multiple publicly-available network documents.

19. The non-transitory computer-readable storage medium of claim 17, wherein the publicly-available information comprises unstructured data and the one or more processors further to:
generate a report that comprises security context aware curated information, wherein the security context aware curated information contains both structured and unstructured data.

20. The non-transitory computer-readable storage medium of claim 17, wherein the publicly-available information comprises unstructured data and the one or more processors further to:
receive an indication of a new security threat from a data feed, wherein the new security threat is filtered to match the input feature; and
retrain the ML model with the indication of the new security threat.

* * * * *